United States Patent [19]

Burris

[11] Patent Number: 5,529,760
[45] Date of Patent: Jun. 25, 1996

[54] OZONE GENERATOR

[76] Inventor: William A. Burris, 7 E. Jefferson Cir., Pittsford, N.Y. 14534

[21] Appl. No.: 355,043
[22] Filed: Dec. 13, 1994
[51] Int. Cl.$^6$ .................................................. B01J 19/00
[52] U.S. Cl. .............................. 422/186.07; 422/186.18; 422/907
[58] Field of Search .................. 422/186.07, 186.18, 422/907; 204/176

[56] References Cited

U.S. PATENT DOCUMENTS

| | | | |
|---|---|---|---|
| 1,498,393 | 6/1924 | McEachron | 422/186.07 |
| 2,822,327 | 2/1958 | Hammesfahr et al. | 204/176 |
| 3,421,999 | 1/1969 | Corwin . | |
| 3,742,301 | 6/1973 | Burris | 317/4 |
| 3,891,561 | 6/1975 | Lowther | 250/541 |
| 3,919,064 | 11/1975 | Lowther | 204/176 |
| 3,967,131 | 6/1976 | Slipiec et al. | 250/539 |
| 4,034,229 | 7/1977 | Grossen et al. | 250/541 |
| 4,232,229 | 11/1980 | Tanaka et al. | 250/541 |
| 4,293,775 | 10/1981 | Feuerstake et al. | 250/535 |
| 4,307,433 | 12/1981 | Takechi et al. | 361/231 |
| 4,461,744 | 7/1984 | Erni et al. | 422/186.18 |
| 4,545,960 | 10/1985 | Erz et al. | 422/186.12 |
| 4,666,679 | 5/1987 | Masuda et al. | 422/186.2 |
| 4,696,800 | 9/1987 | Sasaki et al. | 422/186.18 |
| 4,725,412 | 2/1988 | Ito | 422/186.19 |
| 4,737,885 | 4/1988 | Akutsu | 361/225 |
| 4,770,858 | 9/1988 | Collins | 422/186.18 |
| 4,872,959 | 10/1989 | Herbst et al. | 204/109 |
| 4,886,645 | 12/1989 | Fischer et al. | 422/186.18 |
| 5,211,919 | 5/1993 | Conrad | 422/186.07 |
| 5,417,936 | 5/1995 | Suzuki et al. | 422/186.07 |

OTHER PUBLICATIONS

"Design calculations for laboratory ozonisers," by Vendillo, "Russian Journal of Physical Chemistry," vol. 34, No. 5, May 1960, p. 546.

"The Chemical Reaction in Silent Electric Discharge. III. The Effect of the Packings on Ozone Formation," by Kihei Morinaga and Momotaro Suzuki, "Bulletin of Chemical Society of Japan," vol. 35, No. 3, Mar. 1962, pp. 429–432.

"Industrial Research Fellow Report No. 5, Chemical Reactions in Non–Disruptive Electric Discharge," by P. L. Spedding, "Chemical Engineer," Jan./Feb., 1969, 2 pages.

"Ozone in Water Treatment Application and Engineering", Engineering Aspects, Cooperative Research Report Engineering Water Works Association Research Foundation, Lewis Publishers, 1991, pp. 1,377, 378, 383–388.

*Primary Examiner*—Donald P. Walsh
*Assistant Examiner*—Daniel Jenkins
*Attorney, Agent, or Firm*—Eugene Stephens & Associates

[57] ABSTRACT

A corona discharge ozone generator has an inter-electrode gap established by dielectric spacers that engage gap confronting surfaces and are distributed in the gap so that the electrodes need not be self-supporting. Also, gas flow impedance material, which can include the gap spacers, is distributed in the gap to ensure substantially uniform flow of an oxygen containing gas.

54 Claims, 6 Drawing Sheets

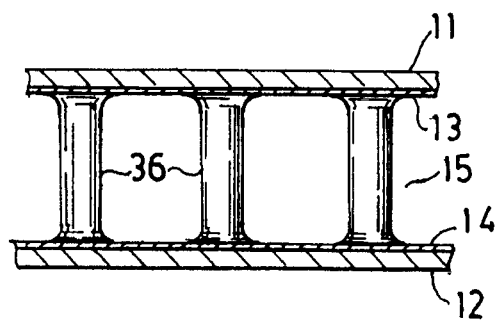
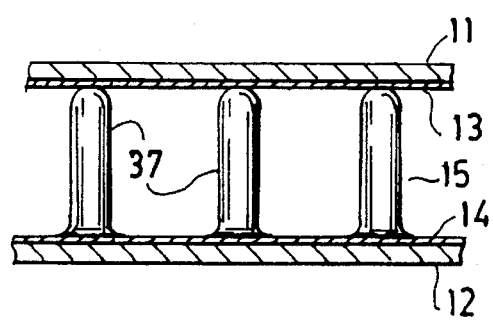
FIG.6A  FIG.7A
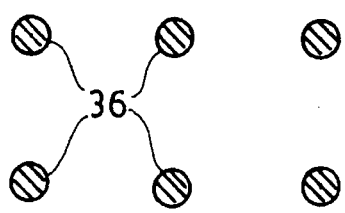
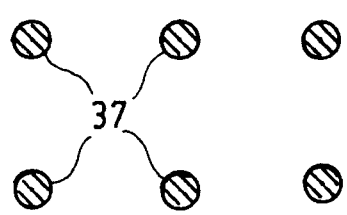
FIG.6B  FIG.7B
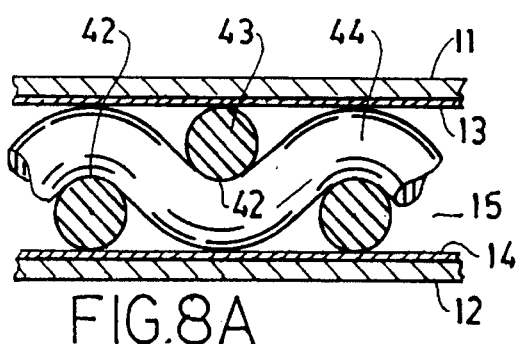
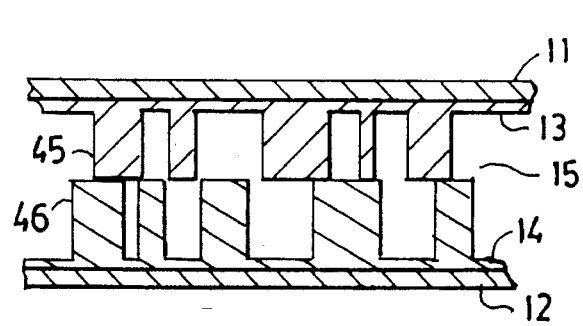
FIG.8A  FIG.9A
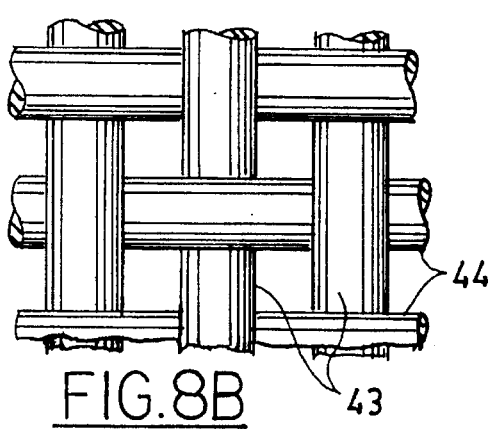
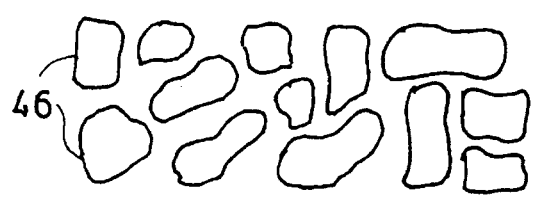
FIG.8B  FIG.9B

OZONE GENERATOR

BACKGROUND

Existing ozone generators involve bulky and expensive electrodes that make the generators large and costly for the amount of ozone produced. These generators also require relatively large transformers for high voltage power supply systems that add to the expense of producing ozone. Since the pressure in a gap between the electrodes is usually higher or lower than ambient atmospheric pressure outside the electrodes, the electrodes have been made strong enough to resist whatever pressure difference occurs, and this has contributed to their size and expense.

Another problem with ozone generators is making flow of the oxygen containing gas uniform throughout the corona discharge gap. If channel flow occurs, the ozone production diminishes, because the corona discharge is not uniformly traversed by oxygen. To take full advantage of the corona discharge gap is important to flow the oxygen containing gas throughout the gap, for maximizing ozone production.

Through extensive experimentation, I have sought ways of producing more ozone with generators that can be made and powered less expensively. I have sought to reduce the size and expense of the electrodes while reliably maintaining an ozone discharge gap between them so that more compact electrodes can make the ozone generators smaller and less expensive. I have also sought to prevent channel flow and to disperse the flow of the oxygen containing gas uniformly throughout the corona discharge gap. Such improvements in electrodes, in reliable maintenance of gap dimensions between electrodes, and in preventing channel flow then lead to reduction in voltage requirements and in the size and expense of the necessary transformer in the generator power supply. Smaller and lighter electrodes and generators can also be easier to cool.

SUMMARY OF THE INVENTION

Traditional generators that produce ozone by passing air or an oxygen containing gas through a corona discharge gap involve electrodes on opposite sides of the gap and a dielectric layer between the electrodes. My improvements on such generators involve the way the gap is established between the electrodes and the way the gas flow is disbursed through the gap to avoid channeling.

The thickness of corona discharge gaps used in my generators is maintained by dielectric spacers. These preferably engage confronting surfaces on opposite sides of the gap at regions that are spaced closely enough to be spanned by whatever dielectric layers and electrodes are involved. A pressure difference normally exists between regions inside and outside the gap, and the pressure differences tend to make the gap either thicker or thinner, depending on whether the gap pressure is above or below atmospheric. The dielectric spacers establishing the gap thickness help relieve the dielectric and electrode layers from independently resisting the force of the gas pressure difference. In effect, a gap thickness established by dielectric spacers at a multitude of regions can be maintained by dielectric and electrode layers that could not hold the gap thickness without the assistance of the spacers. This affords the freedom to select from a wider variety of thinner and lighter dielectric and electrode layers, which in turn makes ozone generators more compact and less expensive. It also avoids thick, stiff, and precision machined electrodes and strong generator housings, which add to generator bulk, as well as expense.

Another aspect of corona discharge gaps established according to my invention is widespread flow through the gap of the oxygen containing gas, to avoid channeling the gas flow along a narrow path through the gap, and to achieve better contact with a corona discharge. This is accomplished with dielectric material positioned in the gap to partially obstruct the gas flow. Partially obstructing the gas flow causes a build-up of pressure along any path where the flow tends to concentrate so that the pressure build-up diverts gas away from such a region into other regions of the gap. This causes the gas flow to spread out and flow through more of the gap, and preferably through substantially all of the gap, which increases the contact between the flowing gas and the corona discharge, and thereby increases the production rate of ozone and the electrical efficiency of the ozone production.

The dielectric spacer material establishing the gap thickness can also partially obstruct the gas flow so that both functions are accomplished by a single material. It is also possible to use different dielectric elements for the spacer function and the partial flow obstructing function by establishing spacers that set the gap thickness and interspersing flow impeding material between the spacers.

My invention can hold corona discharge gaps and dielectric layers to relatively thin dimensions. This helps reduce the voltage required to produce the corona discharge, which reduces the size and expense of the transformer required, which in turn saves space and weight and makes ozone generation less costly. Thin dielectric layers, gaps, and electrodes also conduct heat better so as to improve and simplify cooling. This often permits air cooling instead of more costly water cooling.

DRAWINGS

Each of the FIGS. 4–16 schematically shows a different dielectric material disposed in a corona discharge gap, viewed in a schematic cross-section in the A portion of each figure and viewed in a schematic plan in the B portion of each figure.

Figure 17:
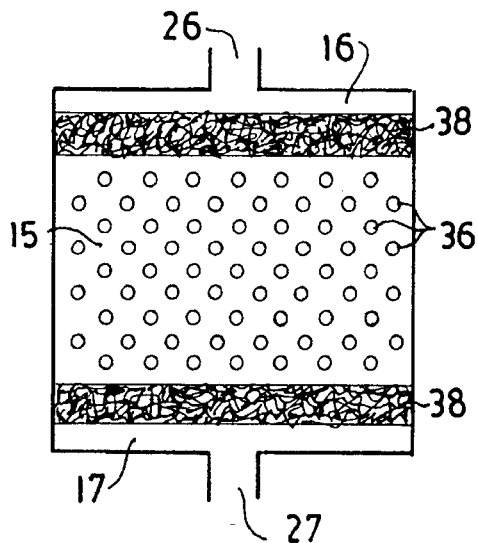

FIG. 17 schematically shows an alternative arrangement of dielectric spacer and flow impeding materials in a corona discharge gap.

FIGS. 18 A, B, and C schematically show three respective variations in dielectric layers and spacers between pairs of electrodes.

FIGS. 19 A, B, C, and D schematically show four respective variations of dielectric layers and spacers between three electrodes.

DETAILED DESCRIPTION

My invention includes many examples of dielectric spacer and flow impeding materials that can be disposed or arrayed in a corona discharge gap in an ozone generator. Before discussing these examples, though, the general requirements for corona discharge ozone generators will be explained.

CORONA DISCHARGE OZONE GENERATORS

My invention improves on the type of ozone generator that uses a corona discharge gap between a pair of electrodes separated by a dielectric layer so that an oxygen containing gas can flow through the gap. Then when a suitable alternating electric potential is applied to the electrodes, a corona discharge occurs that converts some of the oxygen to ozone in the gas flowing through the gap. The electrodes and dielectric layers can differ in number, materials, and configuration and the gap can have different thicknesses. The arrangements for gas flow can vary, as can the power supply, voltage, and frequency of the applied potential.

ELECTRODES

Electrodes usable in my generators are formed of conductors that are normally metal. Aluminum and stainless steel sheets and foils and metallic coatings are preferred for keeping the electrodes compact, cool, and inexpensive. Electrodes can be configured as flat or plane, and they can also be curved, spiraled, or wound into cylindrical, conical, or other configurations. Plane electrodes are preferred for simplicity, but other configurations are also workable and can make generators even more compact.

At least two electrodes are required, but any additional number can also be used. The electrodes are spaced apart so that at least one corona discharge gap occurs between them, but gaps can also be arranged on opposite sides of electrodes sandwiched between other electrodes.

Electrodes are preferably sufficiently flexible to engage all the gap spacers and conform to the gap thickness defined by the spacers. On the other hand, the electrodes are preferably stiff enough and strong enough to bridge the gap between spacers so that pressure differences inside and outside the gap will not cause significant electrode deformation between the points supported by the spacers. In other words, the electrodes are flexible enough to conform to the spacers and strong enough to maintain the gap established by the spacers.

DIELECTRIC LAYERS

At least one dielectric layer is interposed between a confronting pair of electrodes so that the electrodes are separated by a dielectric layer, as well as a gap. The dielectric layer is preferably made thin to help reduce the voltage required to establish a corona discharge. At the same time, the dielectric layer must withstand the applied voltage so that the voltage does not punch through the dielectric layer and establish a short circuit between the electrodes.

Many dielectric materials have been suggested for use in corona discharge ozone generators, and many of these are satisfactory. I prefer glass or mica for the dielectric layer. Some ceramic and resinous materials also work well in certain applications. Expense and structural properties of dielectric materials are also relevant to ozone generator construction, as well as dielectric strength and ozone and corona resistance.

A dielectric layer can be positioned between two electrodes so that there is a corona discharge on both sides of the dielectric layer, but I prefer that the dielectric layer be closely adjacent or attached to an electrode so that the corona discharge occurs on only one side of the dielectric layer. Disposing a dielectric layer on an electrode can be accomplished by coating or laminating the electrode with a dielectric material or coating or laminating an electrically conductive material on a dielectric layer.

GAP

The gap is where a corona discharge occurs between electrodes and where an oxygen containing gas flows through the generator. The gap has a gas inlet and outlet and is preferably thin, on the order of a few millimeters or less. The gap is preferably uniform in thickness, but gaps that vary in thickness are also known to work. Edges of the gap between the inlet and outlet are sealed so that gas can enter and exit only where desired.

Since at least one dielectric layer is arranged between each pair of electrodes, along with a gap, the confronting surfaces on opposite sides of the gap can be either electrode or dielectric layer. The way the gap thickness is established and the way flow of the oxygen containing gas is dispersed throughout the gap are important to reducing the size and expense of ozone generators and improving their efficiency.

Figure 1:
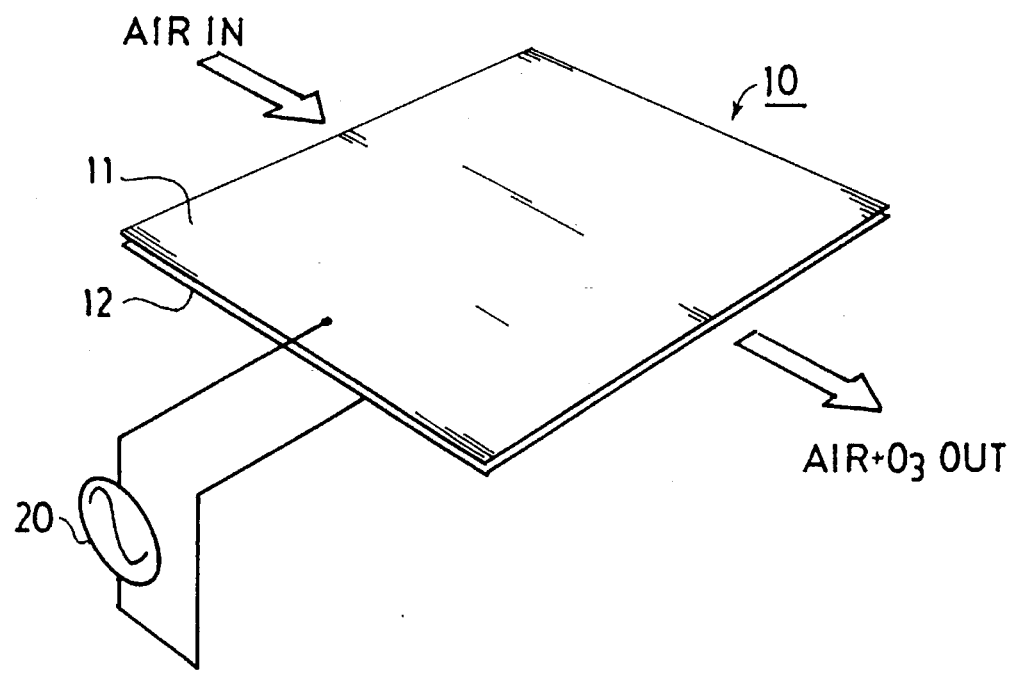
FIG. 1 is a schematic perspective view of a compact ozone generator, having a corona discharge gap established according to my invention.

FIG. 1 schematically illustrates a simple form of an improved ozone generator 10 according to my invention. It consists of a pair of flat electrodes 11 and 12 that are separated by a thin gap 15 and by a pair of dielectric layers 13 and 14, as shown in the fragmentary and schematic sectional view of FIG. 2. A source of alternating current 20 applies a potential to electrodes 11 and 12 that is sufficient to produce a corona discharge in gap 15. Air or an oxygen containing gas flows into an inlet region of gap 15, disburses throughout gap 15, and flows out through an exit region from gap 15, which is otherwise sealed around its edges. The establishment of gap thickness and gas flow impedance for gap 15 is shown in FIG. 2 and in the succeeding views of the drawings.

Figure 2:
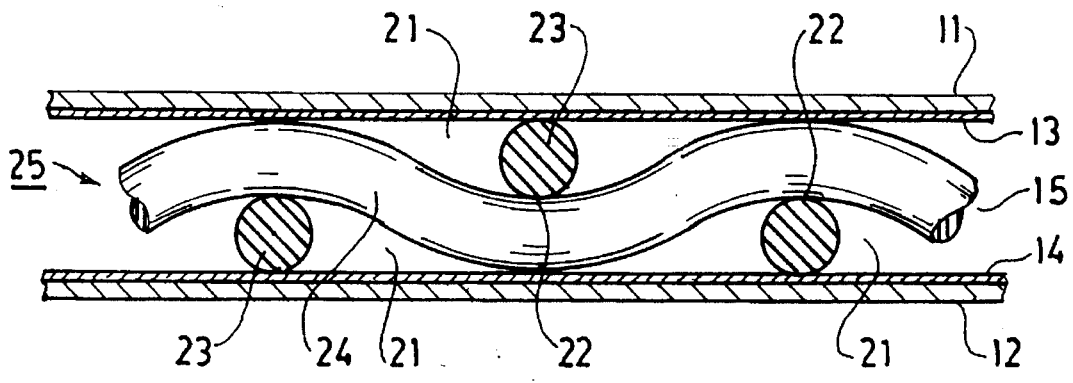
FIG. 2 is a partially schematic, enlarged cross-sectional view of a fragment of the gap of the generator of FIG. 1.

A dielectric spacer that establishes the thickness of gap 15 has the preferred form of a net or mesh 25, as shown in FIG. 2. Net 25 is formed of strands 23 and 24 arranged to cross each other at intersections 22. Strands 23 and 24 can be formed of resinous material, and a variety of resinous nets 25 are available. Strands 23 and 24 can also be formed of or contain fibers or filaments of glass or ceramic material. The material used for strands 23 and 24 must withstand the corona discharge, the ozone gas, and other conditions that exist within the gap.

The combined thickness of strands 23 and 24, where they cross at intersections 22, constitutes dielectric spacers that establish the thickness of gap 15. Single lengths of strands 23 and 24 extend between intersections 22, which creates spaces 21 through which an oxygen containing gas can flow. The lengths of strands 23 and 24 extending between intersections 22 also partly obstruct gap 15 and provide gas flow impedance that forces the through flowing gas to spread out and disperse throughout gap 15. Any tendency to channel through mesh or net 25 is partially obstructed by the strands 23 and 24 extending between intersections 22, which diverts any flow concentration to sparser flow regions so that gas flow is well dispersed throughout gap 15. This ensures adequate gas flow throughout the corona discharge region of the gap so that all the flowing gas is contacted by corona discharge and that substantially no corona discharge occurs without encountering flowing gas. This optimizes the conversion of oxygen to ozone and makes the ozone generator more efficiently use its input energy.

Net strands 23 and 24 can be woven as illustrated in FIG. 2 so that intersections 22 are maintained by inter-strand frictional engagement. Also, strands 23 and 24 can be bonded together at intersections 22.

If strands 23 and 24 are bonded to dielectric layers 13 and 14 where the strands touch the dielectric layers at points opposite intersections 22, and dielectric layers 13 and 14 are bonded to the adjacent electrodes 11 and 12, then the generator can withstand and contain internal pressure within the gap greater than ambient external pressure. Otherwise, if the gap pressure is lower than ambient air pressure, dielectric layers 13 and 14 and electrodes 11 and 12 are pressed against the gap thickness points established by strands 23 and 24.

The material of net 25 must be a dielectric and must withstand corona discharge and ozone, but otherwise can vary widely. Suitable resinous materials, depending on generator applications, include polyethylene, polypropylene, polyvinyl chloride, polyurethane, polyester, poly- tetrafluoroethylene, polyvinylidenefluoride, and other flouro polymers. Strands can also be formed from inorganic dielectric materials such as glass or ceramics, and strands can be formed of mixtures of materials such as inorganic fibers in a resinous matrix.

Figure 3A:
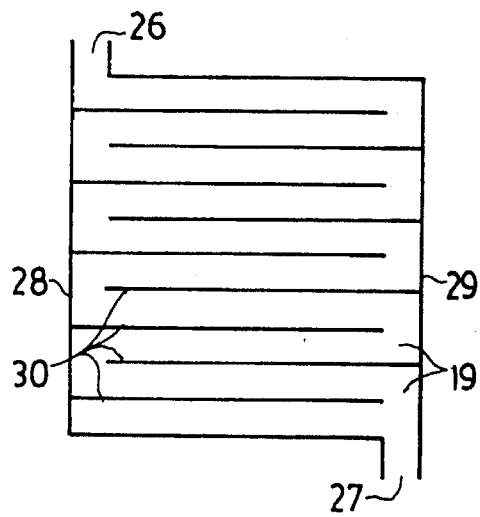
FIGS. 3A and 3B are schematic plan views of alternative generator gap spacers.
Figure 3B:
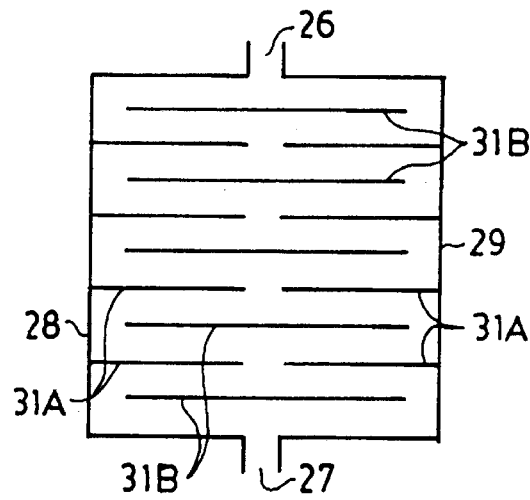

Another way of establishing both gap thickness and gas flow impedance is schematically illustrated in FIGS. 3A and 3B, which show plan views of the interior of flat plate ozone generators. Between a gas inlet 26 and a gas outlet 27 are arranged dielectric spacer strips 30. Strips 30 can be strands or ridges whose thickness or elevation establishes gap thickness. Their parallel arrangement leaving open strand end regions 19, as shown in FIG. 3A, forces the through flowing gas into a zigzag pattern. The zigzag, labyrinthine flow of the gas forces the gas to traverse the full extent of the gap and pass throughout the corona discharge region. No channel flow is possible, so that strips 30 also provide suitable gas flow impedance.

A similar arrangement of parallel strands 31 in the embodiment of FIG. 3B forces the gas flow to divide and pass around the ends of center strands 31B and then flow inward to pass between strands 31A that extend inward from opposite end regions 28 and 29. The effect is a double zigzag gas flow proceeding back and forth from center to side edge regions 28 and 29.

Figure 4A:
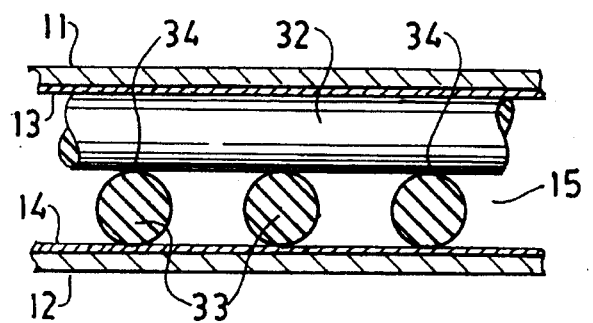
Figure 4B:
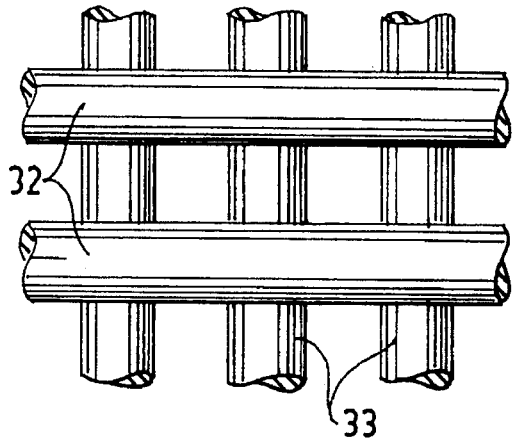

FIGS. 4A and 4B show another form of net or mesh used as a dielectric spacer and gas flow impedance in gap 15 between electrodes 11 and 12 and dielectric layers 13 and 14. Dielectric strands 32 and 33 cross each other without being interwoven. They are bonded together at their intersections 34 where the combined thickness of each of the strands establishes thickness for gap 15. Gas flow is channeled along strands 32 and 33 and through spaces between strands, which represent a sufficient impedance to disburse gas flow throughout gap 15.

Figure 5A:
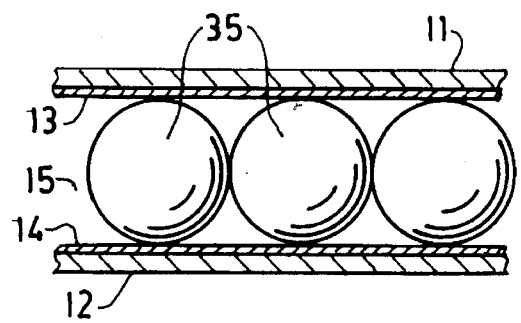
Figure 5B:
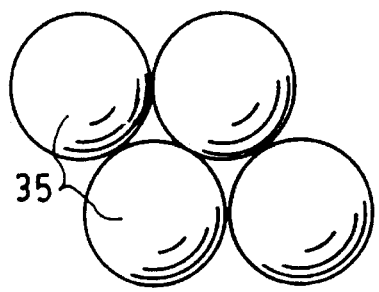

The dielectric spacing and flow impeding material shown in FIGS. 5A and 5B is in the form of spheres 35 that are packed together within gap 15. The diameters of spheres 35 establish thickness for gap 15; the open spaces between spheres 35 allow an impeded flow of an oxygen containing gas.

The dielectric spacers shown in FIGS. 6A and 6B are formed as dielectric columns 36 that extend between and are bonded to dielectric layers 13 and 14. Depending on dimensions and aspect ratios, columns 36 could be positioned within gap 15 without being bonded to whatever materials provide the confronting surfaces on opposite sides of gap 15.

At this point it should be mentioned that any of the dielectric spacer materials illustrated in this application can be bonded to the surfaces that confront the gap. These surfaces can be either dielectric layer or electrode. Also, a dielectric spacer can be bonded to one gap confronting surface and not another. If the dielectric spacer is bonded to both gap confronting surfaces, it can hold these surfaces against separation and can thus maintain gap thickness against an internal gas pressure higher than external pressure. This can allow the oxygen containing gas to be pumped through the gap, causing the gas pressure in the gap to exceed ambient pressure. If the dielectric spacers are not bonded to the gap confronting surfaces, then the through flowing gas is preferably drawn from the gap outlet so that the internal gap pressure is less than ambient atmosphere, which holds the electrodes against the spacers. External pressure can also be maintained higher than internal gap pressure by using a pressurized container for the generator or by applying pneumatic, hydraulic, or mechanical pressure to the generator.

This is also a good place to mention that the dielectric spacers shown in the preferred embodiments of this application preferably engage gap confronting surfaces at points on lines perpendicular to the gap confronting surfaces. This disposes the gap establishing dielectric material to extend directly across the thickness of the gap, which is the simpler and preferred way of establishing the gap thickness dimension.

The dielectric spacers establishing gap 15 in the embodiment of FIGS. 7A and 7B are columns 37 that are molded into dielectric layer 14 on electrode 12. The opposite ends of columns 37 either engage or are bonded to dielectric layer 13 on electrode 11. The result is similar to the dielectric columns 36 of FIGS. 6A and 6B, except for the way the columns are formed.

The dielectric gap spacer shown in FIGS. 8A and 8B is similar to mesh 25, shown in FIG. 2, except for the intersections 42 between strands 43 and 44 being more closely spaced. The weaving together of strands 43 and 44 is shown in FIG. 8B, and again, strand intersections 42 can be bonded or unbonded.

The dielectric gap spacers shown in FIGS. 9A and 9B are irregularly contoured projections 45 and 46 that are molded respectively into dielectric layers 13 and 14. Projections 45 and 46 all extend to the same height or distance from respective base layers 13 and 14 so that the free ends of projections 45 and 46 engage each other in a plane through the center of gap 15. The spaces between projections 45 and 46 leave a multitude of tortuous passageways through gap 15, to ensure adequate flow impedance and widespread dispersal of gas flow throughout gap 15. The irregular contours of projections 45 and 46 ensure that they contact each other in a multitude of regions in the central plane of gap 15.

Figure 10A:
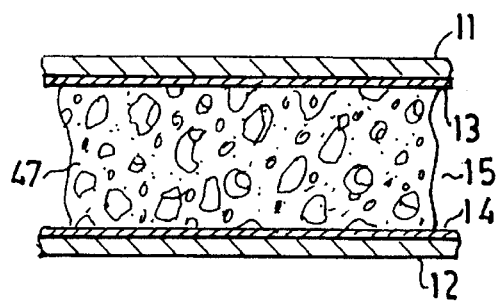
Figure 10B:
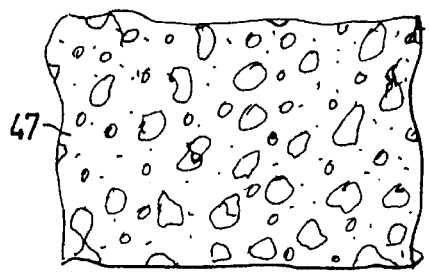

The dielectric gap spacer of FIGS. 10A and 10B is an open cell foam 47 having a thickness that establishes gap 15 and having a multitude of openings through which gas can flow. The open area of foam 47 preferably exceeds the solid or closed area, which in turn is adequate to maintain the separation of gap confronting surfaces. Foam 47 can be bonded or unbonded to the gap confronting surfaces.

Figure 11A:
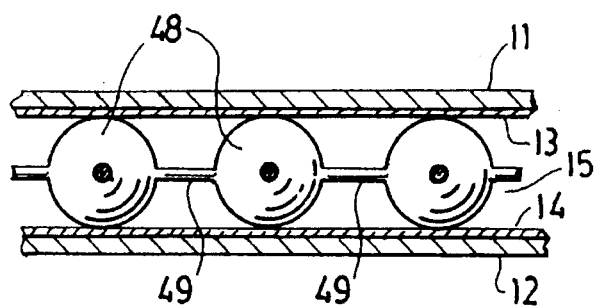
Figure 11B:
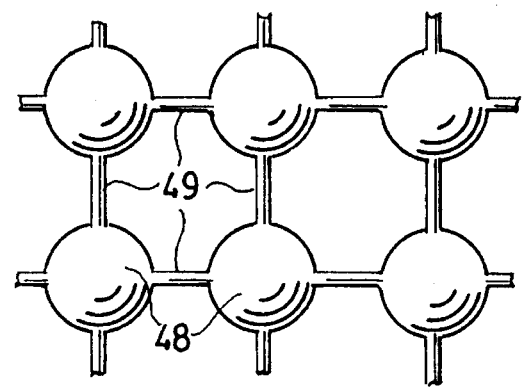

The dielectric gap spacer of FIGS. 11A and 11B is a molded, dielectric material providing molded spacers 48 separated by molded strands 49. Spacers 48 can have a variety of shapes resembling spheres, columns, and others, and interconnecting strands 49 holds spacers 48 in a regular and uniform array distributed throughout gap 15. The length of strands 49 establishes the impedance to gas flow by increasing or decreasing the open areas between spacers 48, and the thickness of spacers 48 establishes the thickness of gap 15. Again, spacers 48 can be bonded or unbonded to gap confronting surfaces.

Figure 12A:
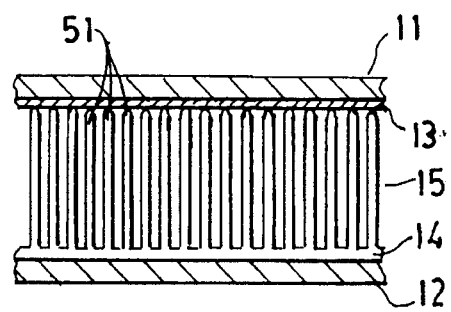
Figure 12B:
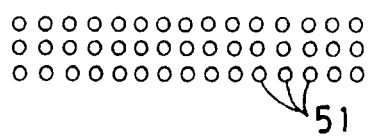

Gap spacers 51 as shown in FIGS. 12A and 12B are similar to spacers 37 of FIGS. 7A and 7B but are formed as taller and thinner columns that are much more closely spaced. Spacers 51 resemble pile or bristles forming a multitude of gap thickness spacers. Columns 51 are shown as molded of dielectric layer 14, and are preferably molded to extend upright from a base material. The narrow inter-column spaces provide the necessary impedance to gas flow for dispersing gas widely throughout gap 15. The close spacing of columns 51 allows them to resist forces tending to reduce the thickness of gap 15, which such narrow columns could not accomplish without being closely spaced.

Figure 13A:
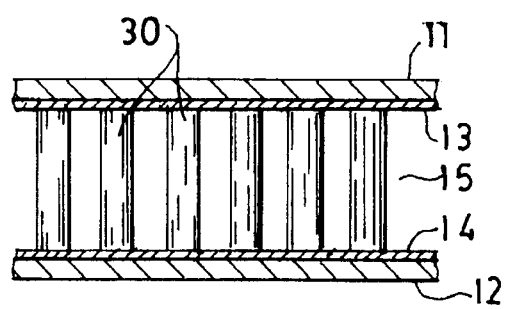
Figure 13B:

FIGS. 13A and 13B illustrate a possible configuration for the ridges or strands 30 of the embodiment shown in plan view in FIG. 3A. Strands 30 are shown as rectangular bars or ridges, but could also have many other shapes such as cylindrical rods. Gas flow around the ends of strands is shown by curved arrows in FIG. 13B. Also, the embodiment of FIG. 3B can use similar strands, and in either case, these can be bonded or unbonded to gap confronting surfaces.

Figure 14A:
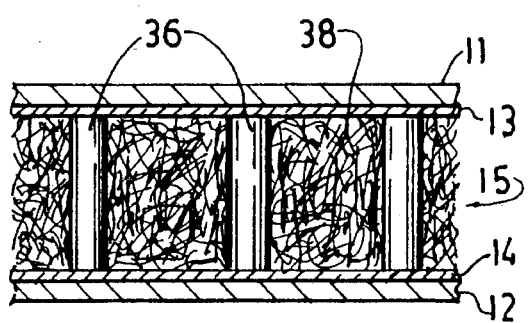
Figure 14B:
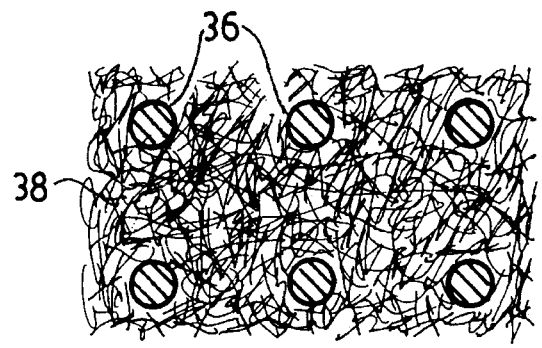

FIGS. 14A and 14B show columns 36 establishing the thickness of gap 15 in a way similar to the embodiment of FIGS. 6A and 6B. Interspersed in the spaces between columns 36 is a dielectric filament material 38 shown as tangled strands. Filament material 38 partially obstructs the spaces between columns 36 to impede gas flow and disperse the gas throughout gap 15. Many variations of filaments can be used including felted, chopped, loose, woven, etc.

Figure 16A:
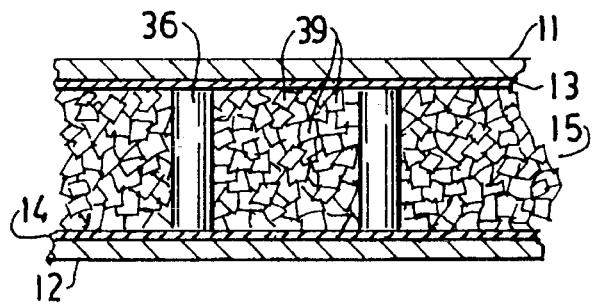
Figure 16B:
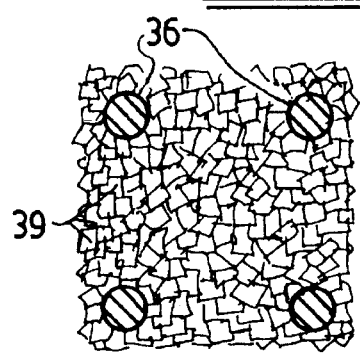

In a similar way, the inter-column gap spaces are filled[ with dielectric particulate material 39 in the embodiment of FIGS. 16A and 16B. Particles 39 are irregular in shape and are loosely filled between columns 36 to allow a multitude of gaps for gas flow between particles 39. The particles thus impede gas flow and disperse the gas widely throughout gap 15.

Figure 15A:
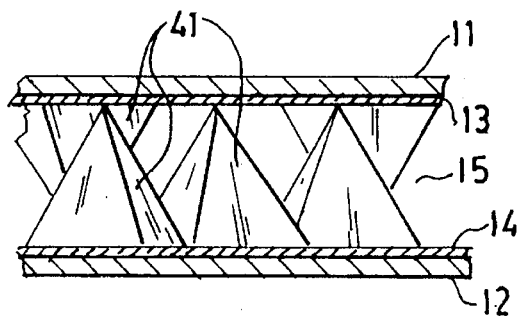
Figure 15B:
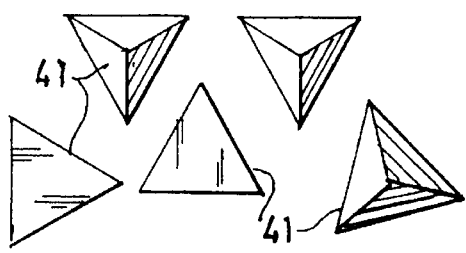

The gap spacers in FIGS. 15A and 15B are tetrahedrons 41 that are dispersed throughout gap 15. These all have the same size so that they each establish the thickness of gap 15. They can also be scattered loosely within gap 15 to provide the necessary gap support, no matter what position they assume.

FIG. 17 is a plan view of an interior of a generator similar to the one shown in FIG. 3A, except that the gap thickness is established by columns 36 such as suggested in FIGS. 6, 14, and 16. FIG. 17 makes the point that a gas flow impeding material, such as filament 38, can be arranged in the region of gas inlet 26 and gas outlet 27 and need not itself be distributed throughout the area of gap 15. Unrestricted plenums 16 and 17 are preferably arranged respectively adjacent inlet 26 and outlet 27. Impeding gas flow in the inlet and outlet regions effectively disperses the gas flow throughout the gap area. Other inlet and outlet arrangements of gas flow impeding material can also be used. One important consideration is that flow impeding material extends from edge to edge within gap 15 so that no unrestricted passageways are left open along gap edges. This applies to spacer elements such as meshes, nets, and other configurations explained above, all of which should extend fully to inside edges of the gap.

FIGS. 18 and 19 show some of the variety of electrode and dielectric layer arrangements that are possible according to my invention. In both figures, electrodes are represented by solid lines, dielectric layers by broken lines, and gap spacer dielectrics by cross-hatching.

Figure 18A:
Figure 18B:
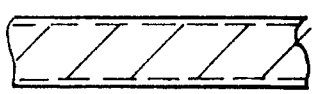
Figure 18C:
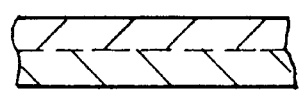
Figure 19A:
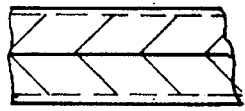
Figure 19B:
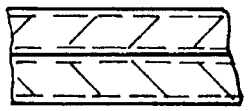
Figure 19C:
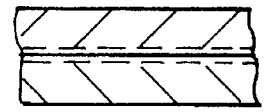
Figure 19D:
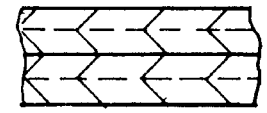

FIG. 18A shows a single dielectric layer next to one of a pair of electrodes separated by a gap so that the gap confronting surfaces constitute a dielectric layer on one side and an electrode on another. FIG. 18B shows dielectric layers on each of a pair of electrodes so that the dielectric layers are the gap confronting surfaces. Dielectric layers, as shown in FIGS. 18A and 18B, can be bonded to respective electrodes, or merely juxtaposed adjacent electrodes. In FIG. 18C, a dielectric layer is disposed in a mid-gap region between a pair of electrodes, with dielectric spacers arranged on both sides of the dielectric layer to establish a gap between each electrode and the dielectric layer. The dielectric spacers not only fix the distance between the electrodes, but also fix the distances between each of the electrodes and the dielectric layer.

FIG. 19 shows three electrode arrangements. FIG. 19A shows dielectric layers on two of the electrodes with a center electrode disposed between these two. This forms two gaps on opposite sides of the center electrode, with the gap confronting surfaces comprising the dielectric layers and the center electrode. FIG. 19B shows dielectric layers on each surface of each of the three electrodes so that two gaps between the electrodes have dielectric layers on all four gap confronting surfaces. FIG. 19C shows a three electrode and two dielectric layer arrangement with the dielectric layers on opposite faces of the center electrode. Gap confronting surfaces comprise both electrode and dielectric layers. FIG. 19D shows a three electrode and four gap arrangement with dielectric layers centered between each pair of electrodes. Spacers in each of the four gaps hold the dielectric layers between the electrodes and also fix the distance between the electrodes.

The examples described above suggest some basic variations that can be used in establishing effective gaps for ozone generators according to my invention. Many of these involve both gap spacers that determine the thickness of the corona discharge gap and flow impedance material that prevents channeling and ensures even flow of gas throughout the gap. Although both of these are preferred, they can be separated or used independently. The flow impeding material 38 of FIG. 17, for example, is not necessarily involved with columns or spacers 36 that establish the gap thickness. A generator whose gap is maintained without spacers can benefit from flow impeding material distributed in the gap to ensure uniform gas flow throughout the gap. Also, gaps established by spacers need not necessarily include flow impeding material.

The dielectric material used for gap thickness spacers and gas flow impedance must resist the corona discharge and ozone in the concentration generated within the gap. Resinous and resin composite materials may be satisfactory for many applications, but more resistant materials may be needed for some applications. Such resistant materials include glass, ceramics, mica paper, silicones, or the more resistant resin materials such as polyvinylidenefluoride, or polytetrafluoroethylene. Composites or combinations of these materials in matrix materials are also possible.

The relationship between the spacer distribution and the strength of the electrodes is a complex one. Spacers engaging confronting gap surfaces at points that are relatively close together can support electrodes that are relatively weak or flexible. On the other hand, if the electrodes are stronger and more rigid, the gap spacers can be spread farther apart. Other factors that affect these relationships include the pressure differential between inside and outside the gap, the desired gap thickness, and the materials involved. My preference tends toward relatively short distances between spacers so that electrodes can be thin, light, and easier to cool. Another factor is whether the spacers also provide flow impedance, which can affect the closeness of their spacing.

I claim:

1. In an ozone generator including at least two electrodes having confronting face surfaces separated by at least one dielectric layer and at least one gap where a corona discharge occurs in a through flow of an oxygen containing gas, the generator comprising:
   a. thickness of the gap being established by dielectric spacer material distributed throughout the gap;
   b. the dielectric spacer material having multiple regions of the same maximum thickness oriented in a direction transverse to the gap;
   c. the regions of maximum thickness being distributed throughout the face surface area of the electrodes;
   d. gap confronting surfaces engaging the maximum thickness regions of the dielectric spacer material on opposite sides of the gap to establish the gap thickness;
   e. the maximum thickness regions of the dielectric spacer material being separated by open regions that are unoccupied by solid material and permit the flow of the oxygen containing gas through the gap; and
   f. distances between the maximum thickness regions of the dielectric spacer material being small enough relative to the mechanical strength of the electrodes so that the electrodes bridge the open regions between the maximum thickness regions to maintain the thickness of the gap in resistance to differences in gas pressure inside and outside the gap.

2. The improvement of claim 1 wherein the dielectric spacer material is formed of the material of the dielectric layer.

3. The improvement of claim i wherein the dielectric spacer material is formed of a net having the maximum thickness regions where strands of the net cross each other.

4. The improvement of claim 3 wherein the strands of the net are bonded together in the regions where the strands cross each other.

5. The improvement of claim 1 wherein the dielectric spacer material is formed of a multitude of dielectric elements that are closely spaced within the gap.

6. The improvement of claim i wherein the dielectric spacer material is formed of columns and bonded to the gap confronting surfaces.

7. The improvement of claim 1 wherein the dielectric spacer material is formed of filaments.

8. The improvement of claim 1 wherein the dielectric spacer material is formed of spheres.

9. The improvement of claim 1 wherein the maximum thickness regions of the dielectric spacer material are uniformly arrayed throughout the area of the gap.

10. The improvement of claim 1 wherein the dielectric spacer material extends between the regions of maximum thickness and is thinner in the regions between maximum thickness.

11. The improvement of claim I wherein the dielectric layer is bonded to a confronting surface of at least one of the electrodes.

12. The improvement of claim 1 wherein the electrodes are interconnected via bonding of the maximum thickness regions of the dielectric spacer material to the gap confronting surfaces.

13. The improvement of claim 1 wherein a gas pressure outside the gap, exceeding a gas pressure within the gap, presses the electrodes against the maximum thickness regions to maintain the thickness of the gap.

14. The improvement of claim 1 wherein the dielectric spacer material is formed as strips arranged to guide gas flow within the gap.

15. The improvement of claim 1 wherein at least one of the electrodes is formed of a metallic coating on the dielectric layer.

16. The improvement of claim 1 wherein the spacers engage gap confronting surfaces at points on lines perpendicular to the gap confronting surfaces.

17. A dielectric spacing system for establishing a gap between confronting surfaces of electrodes separated by at least one dielectric layer, the electrodes being arranged in an ozone generator that produces a corona discharge in the gap while an oxygen containing gas flows through the gap, the spacer system comprising:
   a. dielectric spacers distributed throughout the area of the gap;
   b. each of the spacers having the same maximum thickness in a cross-gap direction;
   c. the gap confronting surfaces engaging the spacers to establish gap thickness equal to the maximum thickness of the spacers; and
   d. the spacers being close enough together relative to the mechanical strength of the electrodes so that the gap thickness at the spacers is maintained in interspacer regions against gas pressure differences inside and outside the gap.

18. The spacer system of claim 17 wherein the spacers are filament crossing nodes in a filament mesh, and interspacer distances are established by the length of filaments between crossing nodes.

19. The spacer system of claim 18 wherein the filaments are bonded together at the crossing nodes.

20. The spacer system of claim 18 wherein the filaments partially obstruct gas flow through the gap so as to increase the uniformity of gas flow throughout the gap area.

21. The spacer system of claim 17 wherein the electrodes are interconnected via bonding of the spacers to the gap confronting surfaces.

22. The spacer system of claim 17 wherein the spacers are formed of the dielectric layer.

23. The spacer system of claim 17 wherein the dielectric layer is bonded to the confronting surface of at least one of the electrodes.

24. The spacer system of claim 17 wherein the interspacer regions are dimensioned to restrict gas flow so that the flow of gas spreads throughout the gap between the electrodes.

25. The spacer system of claim 17 wherein the dielectric spacers are formed of a multitude of dielectric elements that are closely spaced within the gap.

26. The spacer system of claim 17 wherein the dielectric spacers are formed of columns bonded to the gap confronting surfaces.

27. The spacer system of claim 17 wherein the maximum thickness regions of the dielectric spacers are uniformly arrayed throughout the gap.

28. The spacer system of claim 17 wherein the spacers are strips arranged to guide gas flow within the gap.

29. The spacer system of claim 17 wherein the spacers engage gap confronting surfaces at points on lines that are perpendicular to the gap confronting surfaces.

30. An ozone generator comprising:
   a. electrodes with bounded surfaces that confront each other across a thin gap in which a corona discharge occurs as an oxygen containing gas flows through the gap during ozone generation;

b. at least one of the surfaces of the electrodes having a dielectric layer confronting the gap;

c. dielectric material distributed in the gap to extend from surface to surface of the confronting electrodes and to extend throughout a central region between edges of the gap between the electrodes;

d. the dielectric material partially obstructing gas flow through the entrance to and exit from the gap to produce resistance to gas flow; and e. the resistance to gas flow provided by the dielectric material being sufficient so that gas is unable to flow predominantly through a minor portion of the gap and is forced by gas pressure responsive to flow resistance to flow through a major portion of the gap.

31. The generator of claim 30 wherein the dielectric material is formed of strands.

32. The generator of claim 30 wherein the dielectric material is formed of a filament mesh.

33. The generator of claim 30 wherein the dielectric material is formed of arrayed spacer elements.

34. The generator of claim 30 wherein the dielectric material separates the electrodes by the thickness of the gap.

35. The generator of claim 30 wherein the dielectric material is bonded to at least one of the gap confronting surfaces.

36. The generator of claim 30 wherein the dielectric material has regions of maximum thickness oriented to establish gap thickness.

37. The generator of claim 30 wherein the dielectric material is formed of particles having maximum dimensions that are less than the thickness of the gap.

38. The generator of claim 30 wherein the dielectric material extends throughout the gap.

39. The generator of claim 30 wherein the dielectric material is strips arranged to guide gas flow within the gap.

40. The generator of claim 30 wherein the dielectric layer is bonded to a gap confronting surface of at least one of the electrodes.

41. The generator of claim 30 wherein the electrodes are interconnected via bonding of the dielectric material to gap confronting surfaces.

42. A system improving uniformity of treatment of the flow of an oxygen containing gas through a corona discharge gap in a generator outputting ozone, the system comprising:

a. the gap being thin and being arranged between bounded confronting surfaces of electrodes at least one of which has a dielectric layer so that a corona discharge occurs substantially uniformly throughout the gap;

b. the gap being partially obstructed by a dielectric material distributed in the gap to afford a partial obstruction to gas flow;

c. the dielectric material being arranged within the gap to extend from surface to surface of the confronting electrodes and throughout a central region between edges of the gap; and d. the flow obstructing dielectric material being arranged relative to the gas flow rate through the gap so that flow resistance pressure causes the gas flow to spread substantially throughout the full extent of the gap.

43. The system of claim 42 wherein the flow obstructing dielectric material is formed of the material of the dielectric layer.

44. The system of claim 42 wherein the flow obstructing dielectric material is formed of filaments.

45. The system of claim 42 wherein the flow obstructing dielectric material is formed of a filament mesh.

46. The system of claim 42 wherein the flow obstructing dielectric material is formed to engage gap confronting surfaces and establish thickness of the gap.

47. The system of claim 42 wherein the flow obstructing dielectric material is formed of spacer elements arrayed throughout the gap to establish thickness of the gap.

48. The system of claim 42 wherein the dielectric material is bonded to gap confronting surfaces.

49. The system of claim 42 wherein the flow obstructing dielectric material is formed of an open cell foam.

50. The system of claim 42 wherein the flow obstructing dielectric material is formed of particles.

51. The system of claim 42 wherein the flow obstructing dielectric material is formed of discrete elements.

52. The system of claim 42 wherein the dielectric material is strips arranged to guide gas flow within the gap.

53. The system of claim 42 wherein the dielectric layer is bonded to a gap confronting surface of at least one of the electrodes.

54. The system of claim 42 wherein the electrodes are interconnected via bonding of the dielectric material to gap confronting surfaces.

* * * * *